S. J. DICKEY.
GAS TRAP.
APPLICATION FILED JULY 14, 1920.
1,413,160.
Patented Apr. 18, 1922.
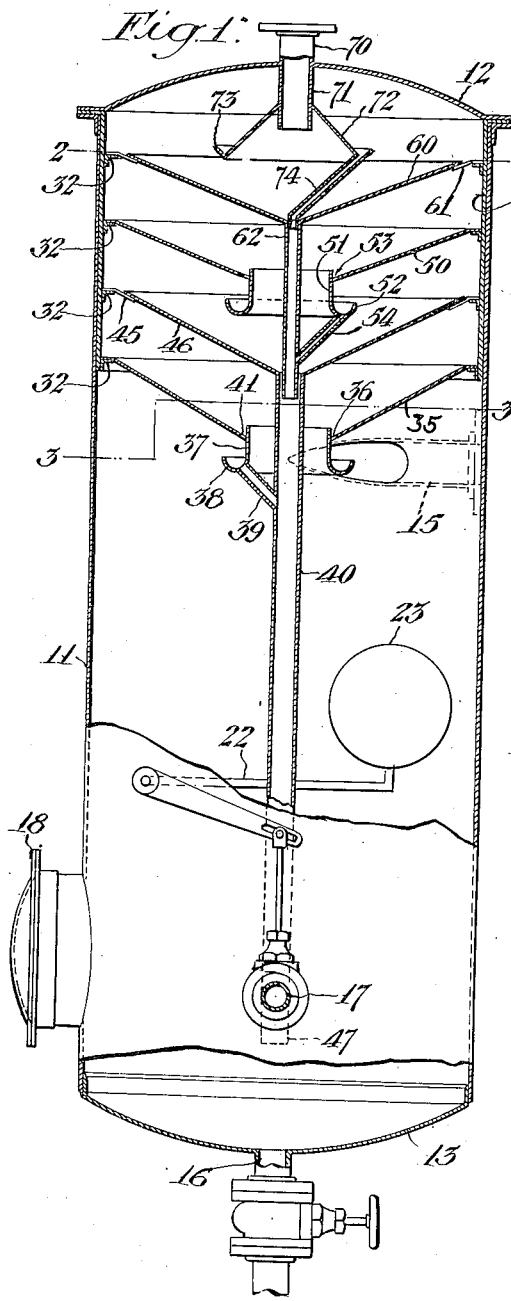
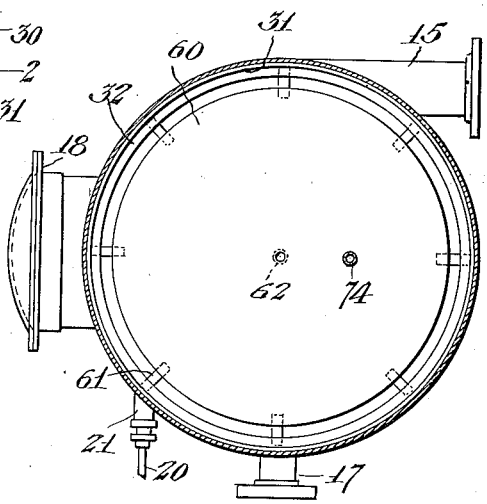
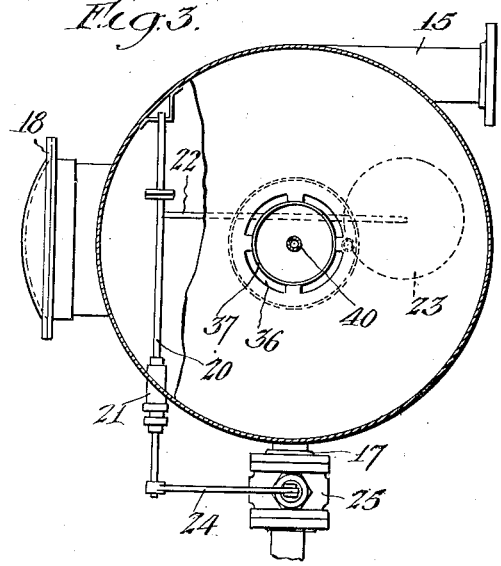
Inventor
Samuel J. Dickey
by Graham & Harris
Attorneys

UNITED STATES PATENT OFFICE.

SAMUEL J. DICKEY, OF LOS ANGELES, CALIFORNIA, ASSIGNOR TO GENERAL PETROLEUM CORPORATION, A CORPORATION OF CALIFORNIA.

GAS TRAP.

1,413,160.  Specification of Letters Patent.  Patented Apr. 18, 1922.

Application filed July 14, 1920. Serial No. 396,265.

*To all whom it may concern:*

Be it known that I, SAMUEL J. DICKEY, a citizen of the United States, residing at Los Angeles, county of Los Angeles, and State of California, have invented a new and useful Gas Trap, of which the following is a specification.

My invention relates to devices used in the production and refining of petroleum and designed to remove particles of liquid from a mixture of liquid and gas, such devices being commonly termed gas traps.

In the following specification and claims, the word "vapor" is used to designate any mixture of gas and liquid particles.

The principal object of the invention is to provide a gas trap which will effect a very complete separation of liquid from vapor, delivering a gas which is quite free from suspended particles of liquid.

Further objects and advantages will be made evident hereinafter.

Referring to the drawings which are for illustrative purposes only,

Fig. 1 is an elevation partly in section along a central plane showing one embodiment of my invention.

Fig. 2 is a section on a plane represented by the line 2—2 of Fig. 1.

Fig. 3 is an elevation partly in section on a plane represented by the line 3—3 of Fig. 1.

In the embodiment of my invention shown, a shell 11 is provided having a tight top 12 and a tight bottom 13. Secured in the side of the shell is a vapor inlet pipe 15, this pipe being so secured in the shell 11 as to deliver the vapor tangentially to the inner surface of the shell. A mud outlet 16 is provided in the bottom and an oil outlet 17 is provided in the side. A hand hole 18 is also provided near the bottom by means of which the interior may be cleaned out if desired. Mounted on a shaft 20 extending through a stuffing box 21 in the side of the shell is a lever 22 carrying a float 23, this float 23 works a lever 24 controlling a valve 25 in the oil outlet pipe 17, the parts 20 to 25 being so arranged that the valve 17 is opened whenever liquid rises to a certain point in the shell 11, this valve being closed whenever the liquid falls to a certain point, the opening and closing of the valve 17 being caused by the rising and falling of the float 23. Secured between the cover 12 and the shell 11 is a flange 30 on a loose sleeve 31 which extends down inside the shell 11 and which carries four sets of angle irons 32. Secured to the lower angle iron with its periphery forming a tight joint with the sleeve 31 is a lower cone 35, this cone having an opening 36 in which a sleeve 37 is secured. The sleeve 37 has a lip 38 communicating by means of a pipe 39 with a central pipe 40, small openings 41 being provided in the cone 35 directly over the lip 38. Secured by means of straps 45 to angle members 32 is a cone 46 having an opening around its outer edge but being tightly joined at its apex to the pipe 40 which extends to a point 47 well down into the liquid in the shell 11. A cone 50 is also tightly secured at its outer edge to the sleeve 30 by means of the angles 32 carrying a sleeve 51 in its center, this sleeve having a lip 52. Small holes 53 are provided above the lip 52 and a pipe 54 is provided so placed as to deliver any oil collecting in the lip 52 to a pipe 62. A cone 60 is secured on straps 61 so as to leave an opening around the outer edge thereof, the apex of this cone being provided with the pipe 62 which extends well down to the pipe 40. Secured in the top 12 is a vapor outlet 70 which extends down as shown at 71, and carries a cone 72 having a lip 73 with a pipe 74 which extends down into the pipe 62.

The method of operation is as follows:

The gas trap being empty, the float 23 is in its lower position, the valve 17 is closed. Vapor at some velocity is admitted through the vapor inlet pipe 15 tangentially to the shell and sets up a whirling or centrifugal motion in the space below the cone 35. This centrifugal motion tends to throw the heavier particles of liquid outwardly, these particles striking against the shell 11 and falling into the bottom of the shell 11. The gas being continuously withdrawn through the pipe 70 passes upwardly in the direction shown by the arrows in Fig. 1 in a tortuous path around the various cones. In this passage there is a continuous deposition of liquid particles on the upper surfaces of these cones, this liquid running downwardly over the surface of the cone and being delivered through the various lips, pipes, etc. into the pipe 40. Liquid continues to accumulate in the bottom of the gas trap until such time as the float 23 lifts and opens the valve 17. This allows liquid to escape and this escape of liquid continues until the level of the liquid is sufficiently reduced to close the valve 17. As a result gas is continuously delivered to the gas outlet 70, this gas being quite free from suspended liquid particles. The separated liquid is delivered somewhat intermittently through the valve 25. By delivering the liquid into the pipe 40 as soon as it is caught by the cones 35, 46, 50, 60 and 72 re-evaporation is prevented and the efficiency of the device is greatly increased.

I claim as my invention:

1. A device for removing liquids from vapors, comprising: a cylindrical shell; inverted cones in the upper part of said shell; means for introducing vapors into said shell below said cones and in such a manner as to set up a vortex therein; a pipe extending along the axis of said shell to a position below the point of entrance of said vapors; a vapor outlet in the top of said shell; and means by which each of said cones delivers any liquid collecting thereon to said pipe.

2. A device for removing liquids from vapors comprising a cylindrical shell; means for introducing the vapors into said shell in such a manner as to set up a vortex therein; a pipe extending along the axis of said shell to a point close to its lower end; inverted cones in the upper part of said shell so arranged that the vapor passing upwardly through said shell takes a tortuous path therethrough; a vapor outlet in the top of said shell; and means by which each of said cones delivers any liquid collecting thereon to said pipe.

In testimony whereof, I have hereunto set my hand at Los Angeles, California, this 7th day of July, 1920.

SAMUEL J. DICKEY.